Figure 2:
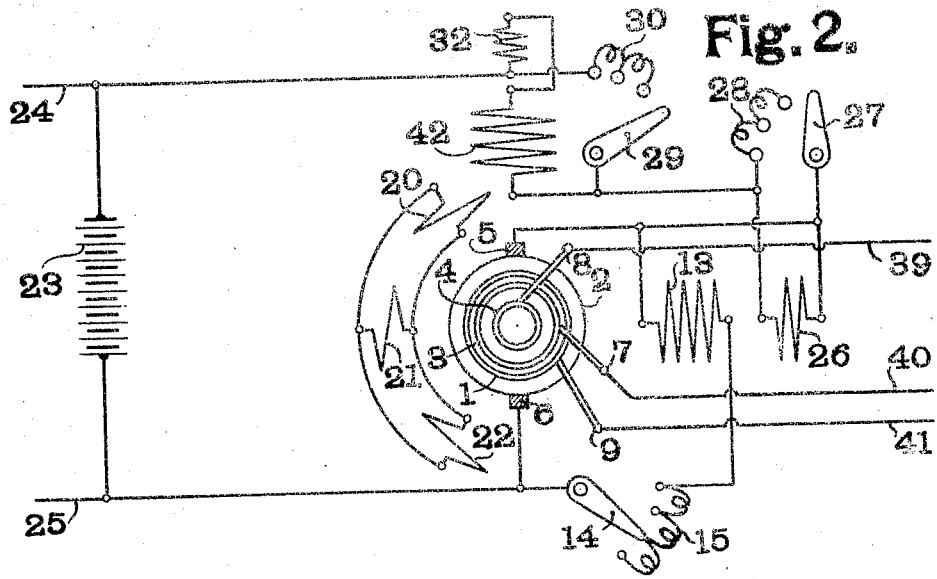

V. A. FYNN.
ROTARY CONVERTER.
APPLICATION FILED JUNE 12, 1911.

1,103,192.

Patented July 14, 1914.
2 SHEETS—SHEET 1.

WITNESSES:
L. L. Mead,
W. A. Alexander.

INVENTOR
Valère A. Fynn
BY E. E. Huffman
ATTORNEY

V. A. FYNN.
ROTARY CONVERTER.
APPLICATION FILED JUNE 12, 1911.

1,103,192.

Patented July 14, 1914.
2 SHEETS—SHEET 2.

WITNESSES:
L. L. Mead
W. H. Alexander

INVENTOR
Valère A. Fynn,
BY
E. E. Huffman
ATTORNEY

UNITED STATES PATENT OFFICE.

VALÈRE ALFRED FYNN, OF LONDON, ENGLAND.

ROTARY CONVERTER.

1,103,192.  Specification of Letters Patent.  Patented July 14, 1914.

Application filed June 12, 1911. Serial No. 632,583.

*To all whom it may concern:*

Be it known that I, VALÈRE ALFRED FYNN, a subject of the King of England, residing at London, England, have invented a certain new and useful Rotary Converter, of which the following is such a full, clear, and exact description as will enable any one skilled in the art to which it appertains to make and use the same, reference being had to the accompanying drawings, forming part of this specification.

My invention relates to rotary converters and has for its object to enable the direct current voltage to be regulated independently of the alternating current voltage, and without altering the magnitude of the alternating voltage impressed on the converter.

My invention is particularly applicable to converters without defined polar projections, either on the stator or on the rotor.

I achieve my objects by adjusting the magnitude of the normal unidirectional magnetization of the machine, by producing an auxiliary magnetization coaxial with the direct current brush line, or more generally speaking, with the magnetization produced by the direct current flowing through the armature, and by neutralizing the disturbing effects of the armature reaction. I prefer to also provide means for preventing the auxiliary magnetization from interfering with the commutation.

In a converter converting alternating to direct current and operating at unity power factor the total unidirectional magnetization may be said to be supplied by the normal or usual direct current exciting winding disposed on the field structure if that usually small component of this total magnetization which appears along the axis of the direct current brushes and is due to the difference between the alternating and the direct current ampere turns is neglected. If the said normal unidirectional magnetization alone is varied then the ratio of the alternating to direct current voltage will not change materially because a converter always tends to maintain its total magnetization constant. This total magnetization must remain constant as long as the impressed alternating voltage is constant in order that the alternating back E. M. F. generated in the converter armature, whose speed is fixed by the periodicity of the supply and the number of poles of the machine, may sufficiently approach the value of the impressed alternating E. M. F. A converter, the normal excitation of which is varied automatically maintains a very nearly constant total unidirectional magnetization by drawing either leading or lagging currents from the alternating mains. Since the voltage ratio changes but little during this process then the resultant magnetization along the direct current brush line will also remain practically constant, but whether the magnitude of the magnetization along this axis, its effect on the direct current voltage is *nil*. According to this invention I produce my auxiliary magnetization along this very same axis and for the reason that a magnetization so located does not and cannot affect the magnetization of the direct current voltage. If I now decrease the normal magnetization and suitably increase the auxiliary magnetization then my direct current voltage will decrease in proportion with the decrease of the normal magnetization while the increase in the auxiliary magnetization can be so chosen as to preclude all necessity for the converter to either take leading or lagging currents in order to maintain the alternating back E. M. F. of the converter at its proper value. In this manner I can vary the ratio of alternating to direct current voltage while retaining full control of the power factor on the alternating side of the converter. But a change in said voltage ratio influences the relative values of the alternating and the direct current ampere turns and also changes the axis of the alternating ampere turns, whereas that of the direct current ampere turns remains fixed as long as the direct current brushes remain fixed. Thus if the direct current voltage is reduced to one-half of its normal value and the output is kept constant then it is clear that the direct current armature reaction will be doubled while the alternating current armature reaction will retain its original value. While these two reactions are coaxial under normal conditions they will be displaced by a certain angle as soon as the direct current voltage is made to differ from the normal in the manner above stated.

Since the alternating current armature reaction is displaced from the direct current armature reaction then only a component of the former will oppose the latter while the other component of the former will act along an axis at right angles to the brush line and will either help or oppose the magnetization due to the normal exciting winding of the converter. I counteract the disturbing influence of these varying armature reactions preferably by disposing certain series windings along the brush axis and at right angles to it. The first of these series windings is so connected as to oppose the direct current armature reaction; the second so as to oppose the alternating current armature reaction. It will, of course, be understood that what I refer to for the sake of convenience as the alternating current armature reaction of a converter is a unidirectional armature reaction stationary in space, as long as the voltage ratio and the power factor of the converter are constant, but due to the alternating currents fed into the armature by way of the slip rings.

The auxiliary excitation I produce along the brush line is likely to interfere with the commutation. To avoid this I produce a local and opposite magnetization covering the commutating zone and of sufficient magnitude to reduce the resulting magnetization in that spot to harmless proportions. A small resultant magnetization may be left to assist commutation and the series winding disposed in this axis and intended to take care of the excess of direct current armature reaction may be so proportioned as to neutralize the latter and provide a commutating field varying in strength with the direct current output.

My invention will be better understood by reference to the accompanying diagrammatic drawings in which—

Figure 1:
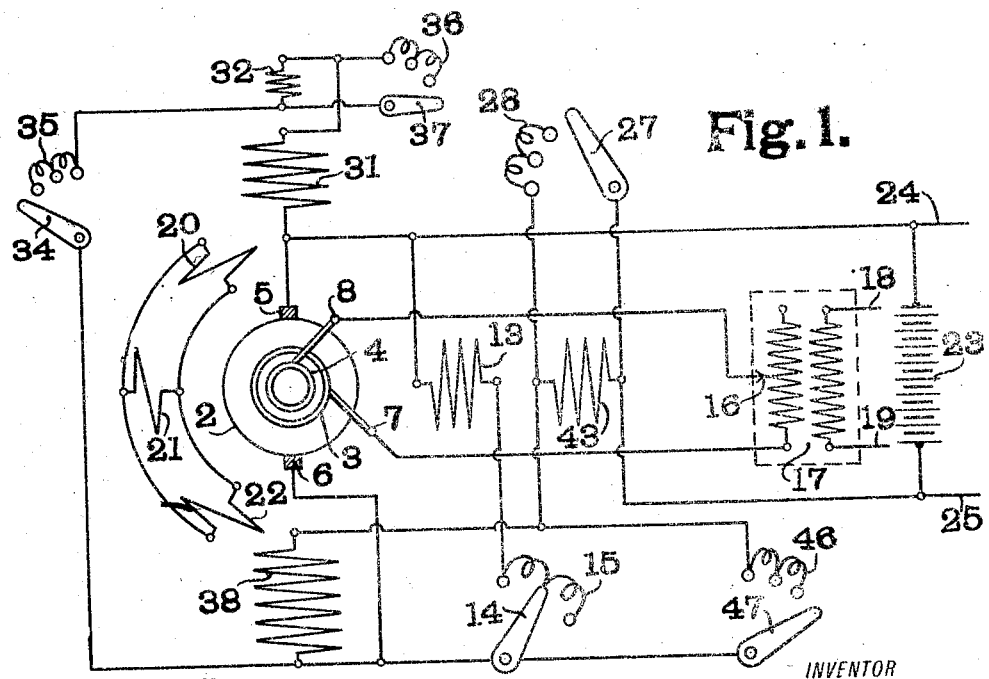

Figure 1 shows my invention as applied to a single phase converter. Fig. 2 shows a modification thereof applied to a three-phase converter and Fig. 3 indicates the preferred structure of the magnetic circuits of my improved converter, and also shows how the several windings of Fig. 1 can be disposed on the rotor and stator. The way in which the various windings are indicated in this figure is intended to merely distinguish these windings from each other and not to show the direction of currents.

Although the drawings all represent 2-pole converters it will be understood that the invention is applicable to converters with any number of pole pairs.

Figure 3:
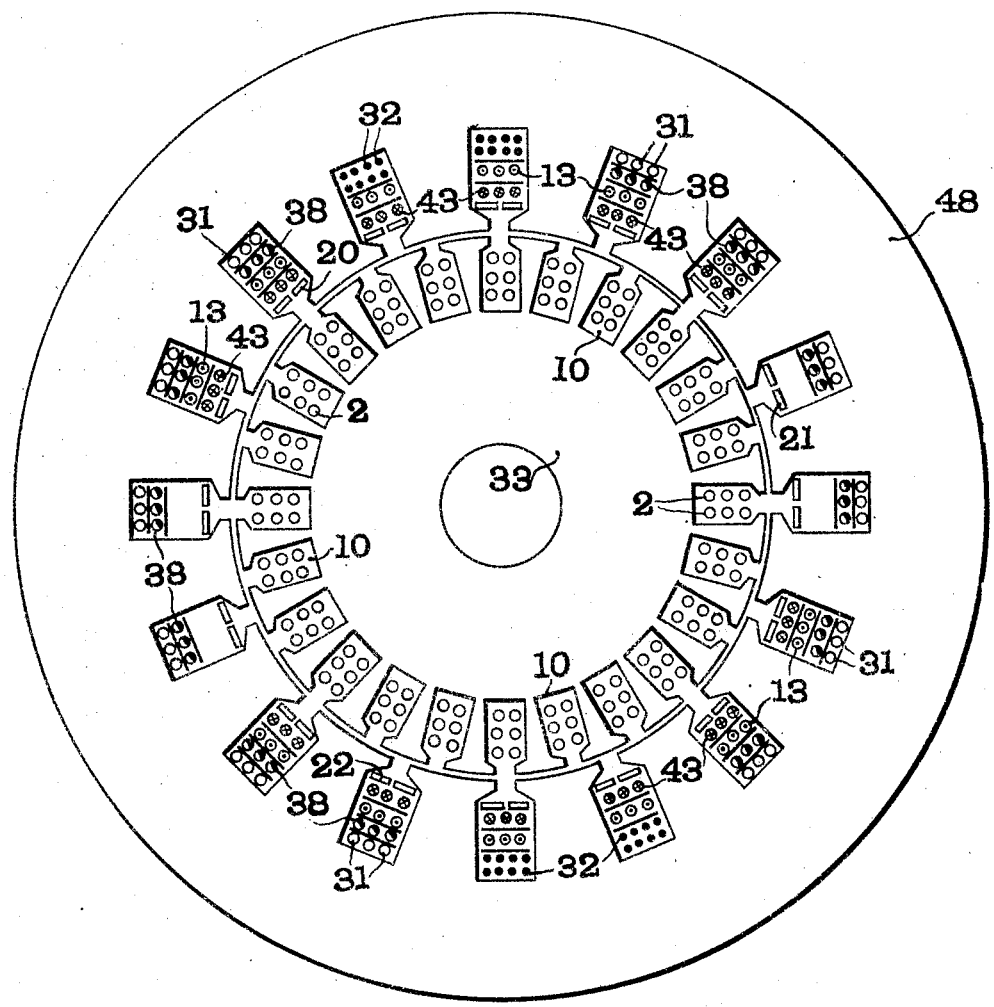

In describing Figs. 1 and 2 it will be convenient to simultaneously refer to the more detailed Fig. 3. Referring to Fig. 1 the revolving member of the converter carries a commuted winding 2 connected to the slip rings 3 and 4, brushes 5—6 are shown as resting directly on said winding. Brushes 7 and 8 connect the two slip rings to the secondary of the transformer 17, which is adjustable at 16, and the primary of which is connected to the alternate current mains 18, 19. The commuted winding 2 is disposed in the slots 10 of the rotor 33 of Fig. 3. The field structure carries a winding 20—21—22 short-circuited along a plurality of axes per pole pair. The normal unidirectional magnetization of the machine is produced by the winding 13 connected to the commutator brushes 5—6 by way of the regulating switch 14 coacting with the resistance 15. This normal exciting winding is preferably disposed along an axis displaced by 90 electrical degrees from the axis of the brushes 5, 6. The auxiliary magnetization in Fig. 1 is produced by the auxiliary exciting winding 31 also connected in parallel to the commutator brushes and controlled by the regulating switch 34, coacting with the resistance 35. A small commutating winding 32 located in the immediate neighborhood of the coil sides undergoing commutation is connected in series with the auxiliary exciting winding 31 and produces a magnetization co-axial with that of 31 and with the brush axis 5, 6. The resistance 36 controlled by the switch 37 affords means for adjusting the magnitude of the magnetization produced by the commutating winding 32. The disturbing effects of the armature reaction which set in as soon as the ratio of the alternating current voltage to the direct current voltage is materially altered, are taken care of in Fig. 1 by the windings 38 and 43 connected in series relation with the commuted winding 2 and located between the brush 6 and the direct current main 25; whereas the other direct current main 24 is directly connected to the brush 5. For simplicity's sake I will refer to windings 38 and 43 as neutralizing windings.

The winding 38 is co-axially disposed with the brush line 5, 6 and is adapted to oppose the excess of direct current armature reaction in that axis. Said excess appears as soon as an attempt is made to alter the voltage ratio of the converter under load. The neutralizing winding 43 is displaced by 90 electrical degrees from the brush axis 5, 6 and is adapted to oppose that component of the alternate current armature reaction which appears along the axis of 43 as soon as the voltage ratio of the converter is varied. The magnetization produced by the winding 38 can be adjusted by means of the resistance 46 connected in parallel to said winding and controlled by the switch 47. The magnitude of the magnetization produced by 43 can be adjusted by means of the resistance 28 connected in parallel thereto and controlled by the switch 27. A translating device 23 in the form of a storage battery is shown connected across the direct current mains 24—25.

The mode of operation of this improved converter is somewhat as follows: When it is desired to operate the machine with the normal voltage ratio then the circuit of the auxiliary exciting winding 31 is left open. The two neutralizing windings 38 and 43 are short-circuited by means of the switches 47 and 27 and the normal unidirectional magnetization is adjusted by means of the switch 14 in such a manner as to secure the desired power factor on the alternate current side. If it is now desired to reduce the direct current voltage then the exciting current in the normal exciting winding 13 is decreased by means of the switch 14 while the magnetization produced by the auxiliary exciting winding 31 is raised from its zero value to one which will bring the total magnetization back to approximately its original value. In addition it is necessary to so position switch 27 that the magnetization produced by the winding 43 and which, of course, is always proportional to the direct current output of the converter, whether said winding is shunted by the resistance 28 or not, is equal and opposed to that component of the alternate current armature reaction which appears along the axis of the winding 43 for the relative magnetization chosen for the shunt exciting windings 13 and 31. It is also necessary to so place switch 47 that the magnetization produced by the winding 38 becomes practically equal and opposed to the difference of the direct current armature reaction and the alternate current armature reaction along the axis of the brushes 5, 6. It is clear that if the windings 38 and 43 are to have no material influence on the direct current voltage of the converter then the magnitude of the magnetization they produce must be adjusted afresh each time the magnitude of the magnetization produced by the shunt exciting windings 13 and 31 is altered, but the adjustment of 38 and 43 can remain unaltered irrespective of the load on the converter as long as the adjustment of 13 and 31 is not altered. The functions of the short-circuited winding 20, 21 and 22 disposed on the field structure are now well understood. They are of particular benefit in case said structure is of the stator type, as shown in Fig. 3 at 12, and their use is especially indicated in the case of single phase converters.

Fig. 2 differs from the previous figure in that the auxiliary shunt exciting winding has been omitted, while the commutating winding 32 is connected in series with the neutralizing windings instead of the shunt auxiliary winding. The arrangement shown in this figure is adapted to yield a voltage ratio which varies considerably with load variations. The general principles of operation are, however, identical in both cases.

The function of the commutating winding 32 is to reduce the resultant magnetic flux in the commutating zone to such a value and direction as will assist rather than impair the commutation.

Fig. 3 clearly shows the relative space position on the stator and rotor of the several windings which have been particularly described with reference to Fig. 1.

I wish it to be understood that I do not limit myself to the particular embodiment of my invention shown in the accompanying drawings, and above described, but that I aim in the appended claims to cover broadly all such modifications as do not depart from the nature of my invention.

Having fully described my invention, what I claim as new and desire to secure by Letters Patent of the United States, is:

1. In a rotary converter, the combination with an armature having slip-rings, a commutator and brushes on said commutator, of a field structure having a normal exciting winding displaced from the axis of the brushes and connected in parallel thereto, an auxiliary field winding co-axial with the brushes, and also connected in parallel thereto, means for varying the axis of the resultant magnetization due to the exciting and auxiliary windings, a neutralizing winding co-axial with and connected in series relation with the brushes, and means for varying the ampere turns of said neutralizing winding.

2. In a rotary converter, the combination with an armature having slip-rings, a commutator and brushes on said commutator, of a field structure having a normal exciting winding displaced from the axis of the brushes and connected in parallel thereto, an auxiliary field winding co-axial with the brushes and also connected in parallel thereto, means for varying the axis of the resultant magnetization due to the exciting and auxiliary windings, two neutralizing windings connected in series relation with said brushes, one of said windings being co-axial with the brushes and the other being displaced therefrom, and means for varying the ampere turns of said neutralizing windings.

3. In a rotary converter, the combination with an armature having slip-rings, a commutator and brushes on said commutator, of a field structure having a normal exciting winding displaced from the axis of the brushes, an auxiliary field winding co-axial with the brushes, means for varying the axis of the resultant magnetization due to the exciting and auxiliary windings, a commutating winding co-axial with the auxiliary field winding, and connected in series therewith, a neutralizing winding co-axial with the brushes and connected in series relation thereto for producing a magnetization proportional to the current flowing through said brushes, and means for varying the ampere turns of said neutralizing winding.

4. In a rotary converter, the combination with an armature having slip-rings, a commutator and brushes on said commutator, of a field structure without defined polar projections and having a normal exciting winding displaced from the axis of the brushes and connected in parallel thereto, an auxiliary field winding co-axial with the brushes, and also connected in parallel thereto, means for varying the axis of the resultant magnetization due to the exciting and auxiliary windings, a neutralizing winding co-axial with and connected in series relation with the brushes, means for varying the ampere turns of said neutralizing winding, and a winding short-circuited along more than one axis per pole pair.

5. The method of adjusting the relation between the magnitudes of the alternating current and direct current voltages of a rotary converter having a commutator and brushes, which consists in producing a unidirectional exciting field and a neutralizing field displaced therefrom, varying the axis of the exciting field relatively to the brush axis, and simultaneously varying the magnitude of the neutralizing field.

6. The method of adjusting the relation between the magnitudes of the alternating current and direct current voltages of a rotary converter having a commutator and brushes, which consists in producing a unidirectional exciting field dependent on the terminal voltage on the direct current side and a neutralizing field displaced therefrom and dependent on the load current on the direct current side, varying the axis of the exciting field relatively to the brush axis, and simultaneously varying the axis of the neutralizing field and the number of turns producing the same.

7. The method of adjusting the relation between the magnitude of the alternating current and direct current voltages of a rotary converter having a commutator, slip-rings, brushes on the commutator, means for producing a unidirectional excitation independent of the load, and means for producing a neutralizing flux dependent on the load, which consists in simultaneously varying the axis of the exciting flux and the axis and magnitude of the neutralizing flux.

In testimony whereof, I have hereunto set my hand and affixed my seal in the presence of the two subscribing witnesses.

VALÈRE ALFRED FYNN. [L. S.]

Witnesses:
   W. A. ALEXANDER,
   ELIZABETH BAILEY.